United States Patent [19]

Nosu et al.

[11] Patent Number: 5,696,226

[45] Date of Patent: Dec. 9, 1997

[54] RESIN COMPOSITION AND MOLDED ARTICLE THEREOF

[75] Inventors: Tsutomu Nosu; Wataru Hiraishi, both of Takamatsu; Yoshiharu Sawa, Sakaide, all of Japan

[73] Assignee: Kyowa Chemical Industry Co., Ltd., Takamatsu, Japan

[21] Appl. No.: 549,148

[22] Filed: Oct. 27, 1995

[30] Foreign Application Priority Data

Oct. 27, 1994 [JP] Japan .................................. 6-263630

[51] Int. Cl.⁶ .................. C08L 27/00; C08K 3/00; C08K 5/00
[52] U.S. Cl. .................. 528/310; 528/322; 524/600; 524/606; 524/711
[58] Field of Search .................. 524/600, 606, 524/711; 528/310, 322

[56] References Cited

FOREIGN PATENT DOCUMENTS

| | | |
|---|---|---|
| 58-46146 | 10/1983 | Japan . |
| 59-102942 | 6/1984 | Japan . |
| 60-79049 | 5/1985 | Japan . |
| 2-187442 | 7/1990 | Japan . |
| 3-111440 | 5/1991 | Japan . |
| 4-88041 | 3/1992 | Japan . |
| 7-118473 | 5/1995 | Japan . |
| 7-145315 | 6/1995 | Japan . |
| 6256588 | 9/1995 | Japan . |

*Primary Examiner*—Samuel A. Acquah
*Assistant Examiner*—P. Hampton-Hightower
*Attorney, Agent, or Firm*—Sherman and Shalloway

[57] ABSTRACT

A resin composition containing a hydrotalcite compound in an amount of 0.01 to 5 parts by weight based on 100 parts by weight of the thermoplastic resin, the hydrotalcite compound having fine crystals of copper oxide deposited on the surface thereof; and a molded article formed of the above resin composition. The resin composition and the molded article formed thereof have excellent heat resistance and weatherability.

17 Claims, No Drawings

RESIN COMPOSITION AND MOLDED ARTICLE THEREOF

DETAILED DESCRIPTION OF THE INVENTION

This invention relates to a resin composition having excellent heat resistance and weatherability and to a molded article thereof. More specifically, it relates to a resin composition having improved heat resistance when heated in molding and when used at high temperatures and further, excellent stability at outdoor use, and to a molded article formed thereof. This invention also relates to a resin composition having an excellent chalking resistance effect against a whitening phenomenon which occurs on the surface of a halogenated resin molded article and to a molded article formed thereof.

Polyolefin, halogenated resins and polyamide resins are generally unstable to heat and light. Particularly, when they are molten under heating in molding or used at high temperatures, deterioration or decomposition is caused by heat. Thereby, a molded article formed thereof are disadvantageously colored, changed in properties, or experience reduced mechanical strength. For purpose of providing the resin molded article with stability to heat and light, a large number of stabilizers have been proposed.

Halogenated resin molded article, in particular, are less stable to heat and light than other resin molded article, and, for instance, dehalogenation occurs due to heating with the result that they undergo significant deterioration or decomposition. In addition, when they are used outdoors, a chalking phenomenon that their surfaces are whitened occurs. In order to stabilize such halogenated resin molded article, Cd—Ba, Pb and Ba—Zn type heat stabilizers, for example, have heretofore been used. However, toxicity of stabilizers is becoming a social issue these days and development efforts are now being focused on Sn and Ca—Zn type stabilizers.

An Sn-type stabilizer has such defects that its amount to be added is limited from a view point of toxicity and that it is expensive. To further improve its heat stability, JP-A-60-79049 (the term "JP-A" as used herein means an "unexamined published Japanese patent application) discloses use of a combination of an Sn-containing stabilizer and a hydrotalcite represented by $Mg_{0.7}Al_{0.3}(OH)_2(CO_3)_{0.15} \cdot 0.57H_2O$. On the other hand, although a Ca—Zn type stabilizer has such advantages that its toxicity is extremely low and it is inexpensive, it has such a defect that the effect of improving its heat stability is small. Under the above situation, it is known that, when a stabilizer which is essentially composed of a hydrotalcite is added to a resin (see JP-B-58-46146 (the term "JP-B" as used herein means an "examined published Japanese patent application)), the resulting resin composition has extremely low toxicity and is excellent in transparency and heat stability, too.

Halogenated resin compositions proposed in these prior arts, however, have been further desired to eliminate a chalking phenomenon which may occur when they are used outdoors.

Alternative methods have been proposed such as one in which an inorganic copper compound such as cuprous chloride, cupric chloride, copper sulfate, basic copper carbonate or copper carbonate (see JP-A-59-102942) and one in which one or two selected from the group consisting of copper-containing hydrotalcite compounds and glycine copper is/are used (see JP-A-2-187442). However, most of them deteriorate the heat stability of a halogenated resin or cannot provide sufficient chalking resistance or weatherability, or the resulting resin compositions have a toxicity. Therefore, their application range is restricted, and improvement of these defects has been desired.

Meanwhile, JP-A-3-111440 proposes a resin composition which is prepared by blending an inorganic copper compound such as copper oxide, copper hydroxide, halogenated copper or carbonate copper and a hydrotalcite compound with a chlorinated resin to improve weatherability and chalking resistance. Further, JP-A-4-88041 proposes a resin composition which is prepared by treating a chlorinated resin with an aqueous solution of an inorganic copper compound such as cupric chloride or copper sulfate and then blending a hydrotalcite compound re-treated with alkali carbonate with the resultant chlorinated resin to improve heat resistance, weatherability and chalking resistance. However, the heat resistance, weatherability and chalking resistance of these resin compositions can not be said to be satisfactorily improved.

Further, JP-A-7-118473 proposes a resin composition which is prepared by adding the following components (i) and (ii) to a chlorinated resin to improve heat stability and chalking resistance.

(i) (a) a copper compound such as copper oxide, copper hydroxide, halogenated copper, copper sulfate or copper acetate and a hydrotalcite compound, or (b) a copper-containing hydrotalcite compound in which the magnesium ions of the hydrotalcite compound are partly substituted by copper ions, and (ii) an organic zinc phosphate compound having a specific structure.

The resin composition disclosed in JP-A-7-118473 described above has such problems that its heat stability and chalking resistance are not necessarily sufficiently improved and that expensive organic zinc phosphate must be used.

The following proposals have been also made to improve the weatherability and heat resistance in polyolefin resins and polyamide resins.

For instance, JP-A-6-256588 proposes a resin composition which is prepared by adding an inorganic copper compound such as copper oxide, copper hydroxide, copper chloride or copper sulfate and a hydrotalcite compound to a polyolefin resin to improve weatherability. The weatherability of this resin composition is improved to some extent, but its heat resistance is not substantially improved compared with the case where only a copper compound is added.

JP-A-7-145315 proposes a resin composition which is prepared by adding a copper compound such as copper oxide, copper hydroxide, halogenated copper, copper sulfate or copper acetate and a hydrotalcite compound to a polyamide resin so as to achieve excellent weatherability. Although this polyamide resin composition has improved weatherability, its effect is not satisfactory.

It is generally thought that copper oxide has almost no chalking prevention effect when it is added to a halogenated resin. However, studies conducted by the inventors of the present invention have revealed that copper oxide has a small effect of improving the chalking resistance of a halogenated resin and causes not so large deterioration by heat. However, since commercial cupric oxide is produced by a dry process, a wet process or an electrolytic process, its crystals grow large and its secondary agglomerated particles are large, resulting in poor dispersibility which makes it impossible to obtain a satisfactory effect.

In view of these defects of the prior art, a first object of the present invention is to provide a resin composition which is a thermoplastic resin having extremely excellent weatherability and heat resistance.

A second object of the present invention is to provide a resin composition which is a copper oxide-containing thermoplastic resin and has excellent heat resistance and weatherability whose effects are both stable.

A third object of the present invention is to provide a resin composition which is excellent not only in heat resistance and weatherability but also in chalking resistance when the thermoplastic resin is a halogenated resin.

The present inventors have conducted studies to attain the above objects and as a result have found that a resin composition in which fine crystals of copper oxide are deposited on the surface of a hydrotalcite compound having a very small particle size and excellent dispersibility has excellent resin dispersibility and that it has a huge number of extremely small crystal particles of copper oxide dispersed over the surface thereof and is stable and in consequence, it can exhibit the maximum stabilizing effect of copper oxide. This finding has led to the present invention.

In other words, the present invention is directed to a resin composition prepared by including a hydrotalcite compound having copper oxide fine crystals on the surface thereof in a thermoplastic resin and to a molded article formed thereof.

The resin composition and the molded article thereof provided by the present invention are described in detail hereinunder.

In the present invention, the hydrotalcite compound to be added to the thermoplastic resin has fine crystals of copper oxide on the surface thereof. The size of the copper oxide fine crystal present on the surface of this hydrotalcite compound is 500 Å or less, preferably 450 Å or less. The crystal size of this copper oxide is calculated using a Scherrer formula based on a full width of half maximum intensity of a diffraction line measured by an X-ray diffractometer.

The hydrotalcite compound having such copper oxide fine crystals on the surface thereof can be obtained by precipitating copper oxide from a copper-containing hydrotalcite compound. Specifically, it can be obtained by subjecting a copper-containing hydrotalcite compound represented by the following formula (1) to a hydrothermal aging treatment at 110° to 200° C., preferably 120° to 170° C. The time for hydrothermal aging is not limited, but it is suitably 2 to 24 hours, preferably 4 to 15 hours, from a view point of productivity.

$$(M^{2+}{}_y Cu_x)_{1-x} Al_x(OH)_2(CO_3)_{x/2} \cdot mH_2O \qquad (1)$$

wherein y+z=1.0, 0.5≧z≧0.01, preferably 0.3≧z≧0.05, 0.25≦x≦0.5, m is a positive number, $M^{2+}$ is $Mg^{2+}$ or a mixture of ($Mg^{2+}+Zn^{2+}$), and when $M^{2+}$ is a mixture of ($Mg^{2+}+Zn^{2+}$), $Mg^{2+}>Zn^{2+}$.

The copper-containing hydrotalcite compound represented by the above formula (1) can be synthesized by a conventional method. For instance, it can be easily synthesized by a method disclosed in JP-B-48-29477. It is assumed that copper is easily deposited on the surface of the copper-containing hydrotalcite compound as copper oxide by the hydrothermal aging treatment for the following two reasons: one is that cupric ions have distortion at an octahedral coordination due to a John-Teller effect, and are slightly unstable to keep a brucite structure that octahedral coordinations such as magnesium ions are arranged in order in a hydrotalcite type crystal structure and the other is that copper hydroxide is liable to be converted into copper oxide in an aqueous solution at relatively low temperatures.

The average secondary particle diameter of the hydrotalcite compound having copper oxide fine crystals dispersed over the surface thereof, used in the present invention, is 0.2 to 7 μm, preferably 0.4 to 4 μm. The hydrotalcite compound is a fine powder which exhibits excellent dispersion in thermoplastic resins. The amount of copper oxide (CuO) present on the surface of the hydrotalcite compound is equivalent to the amount of the hydrotalcite compound of the above formula (1) deposited by hydrothermal aging treatment and is typically 2 to 45% by weight, preferably 4 to 40% by weight, based on the hydrotalcite compound having copper oxide fine crystals on the surface thereof. When the amount of copper oxide is below the above range, the weatherability of the resin is not improved sufficiently, and when the amount of copper oxide is above the range, heat stability may deteriorate.

The hydrotalcite compound having fine crystals of copper oxide on the surface thereof exhibits excellent dispersion in a thermoplastic resin. To further improve its dispersibility, its surface may be covered with an anionic surfactant, silane coupling agent, titanium coupling agent, aliphatic acid ester of polyhydric alcohol or the like. The obtained compound which is heated at 200° to 300° C. to remove water of crystallization may be used.

The hydrotalcite compound having fine crystals of copper oxide on the surface thereof, used in the present invention, is used in an amount of 0.01 to 5 parts by weight, preferably 0.1 to 3 parts by weight, based on 100 parts by weight of the thermoplastic resin.

In the present invention, any thermoplastic resins which are generally used as a molding resin can be used as the thermoplastic resin whose stabilities are improved by blending the hydrotalcite compound. Particularly, since the hydrotalcite compound has fine crystals of copper oxide on the surface thereof, a resin which develops the stabilizing effect of the copper oxide is used effectively. Halogen or halogen compound containing thermoplastic resins is more advantageous as the thermoplastic resin. The term "halogen or halogen compound" used herein includes not only an additive such as a catalyst, flame retardant, stabilizer, antistatic agent or germicide, or a derivative thereof but also a halogen-containing monomer which is used as a constituent of a resin.

Typical examples of the thermoplastic resin include halogenated resins, polyolefin resins, polyamide resins, polyurethane resins, polyester resins, polyether resins and the like. Preferred thermoplastic resins are halogenated resins, polyolefin resins and polyamide resins, and especially preferred are halogenated resins.

A brief description is given of specific examples of these resins hereinafter.

The term "halogenated resin" includes a halogenated resin which is generally used as a molded article, with specific examples thereof including homopolymers and copolymers obtained by polymerizing monomers such as halogenated vinyl and halogenated vinylidene and copolymers between these and compounds copolymerizable therewith, such as vinyl chloride-ethylene copolymer, vinyl chloride-vinyl acetate copolymer, vinyl chloride-styrene copolymer, vinyl chloride-urethane copolymer, vinyl chloride-methacrylate copolymer and the like.

Specific examples of the halogenated resin further include resins obtained by halogenating a polyolefin resin such as polyethylene or polypropylene, e.g., chlorinated polyolefin resins exemplified by chlorinated polyethylene, chlorinated polypropylene and the like. The present invention can be applied also to a polymer blend between a halogenated resin and a resin not containing halogen, such as ABS, MBS, EVA, butadiene resins, urethane resins, vinyl acetate resins or the like.

Illustrative examples of the polyolefin resin include α-olefin homopolymers and copolymers such as a high-density or low-density polyethylene, polypropylene, polybutene-1, poly-3-methylpentene, or an ethylene-propylene copolymer; copolymers between these α-olefins and conjugated diene, non-conjugated diene, (meth)acrylic acid, (meth)acrylic acid ester or vinyl acetate; and elastomers such as ethylene-propylene copolymer elastomer, ethylene-propylene-dicyclopentadiene copolymer elastomer, ethylene-butadiene copolymer elastomer and the like. These may be used as a polymer mixture.

A polyamide resin which can be obtained by polymerizing lactam, dicarboxylic acid or diamine as starting monomer materials and is generally produced on an industrial scale can be used as the polyamide resin. Illustrative examples of the monomer include lactams or aminocarboxylic acids, such as ε-caprolactam, ω-laurolactam, 11-aminoundecanoic acid, 12-aminododecanoic acid and p-aminobenzoate; diamines such as ethylenediamine, trimethylenediamine, tetramethylenediamine, hexamethylenediamine, undecamethylenediamine, dodecamethylenediamine, m-xylidenediamine, m-phenylenediamine and p-phenylenediamine; and dicarboxylic acid monomers such as adipic acid, sebacic acid, dodecanoic acid, terephthalic acid, isophthalic acid and naphthalene-2,6-dicarboxylic acid. Specific examples of the polyamide include nylon 6, nylon 12, nylon 46, nylon 66 and the like.

Resins other than the afore-mentioned halogenated resins, polyolefin resins and polyamide resins, such as polyurethane resins, polyester resins, polyether resins and the like can be also used as the thermoplastic resin.

To the resin composition of the present invention may be added other stabilizers which are commonly used, such as calcium, zinc, magnesium, barium, tin or lead containing stabilizers, their double salt stabilizers, non-metal organic stabilizers and the like. Specific examples of the stabilizers include organic acid salts, oxides, hydroxides and basic inorganic acid salts of metals, ordinary hydrotalcite compounds, organic phosphite compounds, organic metal phosphates, polyols and their organic acid esters, nitrogen-containing non-metal compounds, antioxidants, ultraviolet and light stabilizers, β-diketone compounds, epoxy compounds, organic tin-containing stabilizers and composite stabilizers of these. These stabilizers are preferably added in an amount of 0.01 to 5 parts by weight based on 100 parts by weight of the resin.

In addition, additives known as resin additives, such as a plasticizer, filler, pigment, reinforcing agent, processing aid, lubricant, flame retardant, foaming agent, antistatic agent, fluorescent agent, mildewproofing agent, germicide and the like may be added as required.

The thermoplastic resin composition of the present invention can be obtained by mixing a resin, the aforementioned hydrotalcite compound and, as required, other additives by a conventional method. The composition may be molded by a conventional method such as injection molding or extrusion molding to produce a molded article.

EXAMPLES

The present invention is further illustrated with reference of the following examples; however these examples are intended to illustrate the invention and are not to be construed to limit the scope of the invention.

[preparation of hydrotalcite compound having copper oxide deposited on surface thereof]

A copper-containing hydrotalcite compound as a starting material can be obtained as follows. A solution A prepared by mixing 1 mol/L aqueous solution of each of magnesium sulfate, copper sulfate and aluminum sulfate to a predetermined composition ratio, and a solution mixture B of a 1 mol/L aqueous solution of sodium carbonate and a 1 mol/L aqueous solution of sodium hydroxide in a required amount corresponding to the amount of the solution A are charged to a reaction vessel while adjusting the solutions to keep the pH values at 9 to 10.5 at normal temperature and normal pressure. A reaction can be carried out similarly even with the chlorides, nitrates and the like of the above metals. The thus obtained reaction product is thoroughly washed with water. The copper-containing hydrotalcite compound obtained in this way is subjected to hydrothermal aging treatment, treated with 2% of sodium stearate at 80° C., dehydrated, washed, dried and pulverized to obtain a stabilizer sample of the present invention.

The hydrotalcite compounds used, hydrothermal aging conditions, intensity of X-ray diffraction line and average secondary particle diameter are shown in Table 1. The term "intensity of X-ray diffraction line" means the intensity of diffraction line of cupric oxide (2θ=35.6°) measured at a tube voltage of 35 kV and a current of 15 mA.

TABLE 1

| Stabilizer No. | Cu-containing hydrotalcite compound |
|---|---|
| A | $(Mg_{0.93}Cu_{0.07})_{0.67}Al_{0.33}(OH)_2(CO_3)_{0.165}$—$0.5H_2O$ |
| B | $(Mg_{0.75}Cu_{0.25})_{0.67}Al_{0.33}(OH)_2(CO_3)_{0.165}$—$0.5H_2O$ |
| C | $(Mg_{0.50}Cu_{0.50})_{0.76}Al_{0.25}(OH)_2(CO_3)_{0.125}$—$0.5H_2O$ |
| D | $(Mg_{0.6}Zn_{0.2}Cu_{0.2})_{0.714}Al_{0.286}(OH)_2(CO_3)_{0.143}$—$0.5H_2O$ |
| E (Comparison) | $Mg_{0.7}Al_{0.3}(OH)_2(CO_3)0.15$—$0.57H_2O$ |

| Stabilizer No. | Hydrothermal aging conditions [temp.] × [time] | Intensity of X-ray diffraction line (CuO) | Crystallite size (CuO) | Average secondary particle diameter | CuO content of sample (wt. %) |
|---|---|---|---|---|---|
| A | 170° C. × 4 hrs | 480 C/S | 250 Å | 0.5 μm | 5.0 |
| B | 150° C. × 15 hrs | 730 C/S | 270 Å | 1.5 μm | 16.2 |
| C | 120° C. × 8 hrs | 1940 C/S | 380 Å | 3.2 μm | 35.7 |
| D | 120° C. × 15 hrs | 970 C/S | 260 Å | 0.9 μm | 13.5 |
| E (Comparison) | 170° C. × 15 hrs | 0 C/S | — | 0.4 μm | — |

[Examples 1 to 6 and Comparative Examples 1 to 5]

Test sheets were prepared by mixing and kneading the below-given materials in the given blend composition at 190° C. with an 8-inch roll for 3 minutes. The thus obtained vinyl chloride resin (PVC) sheet was cut into a 5×3 cm square to prepare a test piece for heat stability measurement. A heat stability test was carried out in a Geer oven heated at 190° C. and the test piece was taken out every 10 minutes to measure the time elapsed until the test piece became black.

Separately, the kneaded sheet was compression-molded under a pressure of 100 Kg/cm² at 190° C. for 5 minutes to obtain a pressed sheet of 1 mm in thickness. An outdoor exposure test was carried out on this pressed sheet which was evaluated for chalking resistance after six months of exposure. As for the exposure method, the pressed sheet was laminated on a stainless sheet inclined at 30° C. Results are shown in Table 2.

Chalking resistance was compared by measuring glossiness and discoloration of the resin surface by a glossimeter and a color difference meter manufactured by Tokyo Denshoku Techinical Center Co., Ltd.

Composition

| | |
|---|---|
| PVC (P = 700) | 100 parts by weight (phr) |
| KM-336P (reinforcing agent) | 7 |
| PA-20 (processing aid) | 1 |
| Calcium stearate | 0.5 |
| Zinc stearate | 0.6 |
| Red iron oxide | 2 |
| Kinds and amounts of stabilizers used | shown in Table 2 |

(Note)
KM-336P is an acrylic, impact resistance reinforcing agent for PVC, manufactured by Kureha Chemical Industry Co. Ltd.
PA-20 is an acrylic agent for improving the processability for PVC, manufactured by Kaneka Corporation.

TABLE 2

| | Stabilizer No. | Amount (phr) | Heat stability at 190° C. (min) | Glossiness (%) | Discoloration value ΔE |
|---|---|---|---|---|---|
| Ex. 1 | A | 1.3 | 60 | 73.5 | 4.5 |
| Ex. 2 | B | 0.35 | 60 | 72.0 | 4.5 |
| | E | 0.95 | | | |
| Ex. 3 | C | 0.17 | 50 | 72.1 | 4.8 |
| | E | 1.13 | | | |
| Ex. 4 | D | 0.45 | 60 | 73.8 | 4.2 |
| | E | 0.85 | | | |
| Ex. 5 | A | 1.3 | 90 | 74.4 | 3.0 |
| | E | 1.0 | | | |
| Ex. 6 | D | 0.5 | 50 | 72.5 | 4.8 |
| | ST-210*¹ | 0.5 | | | |
| Comp.Ex. 1 | E | 1.3 | 40 | 48.2 | 28.5 |
| Comp.Ex. 2 | CuO*² | 0.06 | 40 | 53.6 | 20.2 |
| | E | 1.3 | | | |
| Comp.Ex. 3 | CuCl$_2$.2H$_2$O*³ | 0.13 | 20 | 68.1 | 10.3 |
| | E | 1.3 | | | |
| Comp.Ex. 4 | CuO*² | 0.1 | 40 | 50.8 | 21.2 |
| | ST-210*¹ | 0.5 | | | |
| Comp.Ex. 5 | — | — | 10 | 48.0 | 27.3 |

In the subsequent Tables, *1, *2 and *3 stand for the following products, respectively.

*1: Partial ester of polyhydric alcohol manufactured by Ajinomoto Co.

*2: Cupric oxide reagent (for chemical use) manufactured by Wako Pure Chemical Industrial Ltd. (crystal particle size measured by an X-ray diffractometer is 4,100 Å, average secondary particle diameter measured by a laser diffraction method is 6.3 μm)

*3: first-class reagent manufactured by Wako Pure Chemical Industrial Ltd., which is cupric chloride dissolved in ethanol.

[Examples 7 to 10 and Comparative Examples 6 to 9]

Test pieces were prepared in the same manner as in Examples 1 to 6 except for their composition given below. The heat stabilities and glossinesses of the test pieces were measured in the same manner, and results are shown in Table 3.

Composition

| | |
|---|---|
| PVC (P = 1,000) | 100 parts by weight (phr) |
| Calcium stearate | 0.3 phr |
| Zinc stearate | 0.2 phr |
| Kinds and amounts of stabilizers | shown in Table 3 |

TABLE 3

| | Stabilizer No. | Amount (phr) | Cu content of composition (%) | Heat stability at 190° C. (min) | Glossiness after 12 months (%) |
|---|---|---|---|---|---|
| Ex. 7 | A | 1.0 | 0.04 | 35 | 84.4 |
| Ex. 8 | B | 1.0 | 0.13 | 30 | 78.9 |
| Ex. 9 | C | 1.0 | 0.28 | 25 | 80.3 |
| Ex. 10 | D | 1.0 | 0.11 | 30 | 88.5 |
| Comp. Ex. 6 | — | 0 | 0 | 10 | 62.8 |
| Comp. Ex. 7 | CuCl$_2$—2H$_2$O*³ | 0.2 | 0.10 | 0 | molding impossible |

TABLE 3-continued

| | Stabilizer No. | Amount (phr) | Cu content of composition (%) | Heat stability at 190° C. (min) | Glossiness after 12 months (%) |
|---|---|---|---|---|---|
| Comp. Ex. 8 | CuO*² | 0.2 | 0.20 | 10 | 61.0 |
| Comp. Ex. 9 | B without deposition of copper oxide | 1.0 | 0.12 | 5 | 51.6 |

[Examples 11 to 17 and Comparative Examples 10 to 12]

100 parts by weight of an ethylene-propylene block copolymer (M1=3.0, Cl=30 ppm), 0.05 part by weight of pentaerythritol-tetrakis[3-(3,5-di-t-butyl-4-hydroxyphenyl) propionate](trade name: Irganox 1010) and 0.05 part by weight of a cyclic neopentane-tetrayl-bis(2,4-di-t-butylphenyl)phosphite (trade name: Ultranox 626) were kneaded and extruded together with stabilizers shown in Table 4 with a biaxial kneading extruder at 230° C. at 130 rpm to prepare pellets. The thus obtained pellets were dried at 120° C. for 2 hours and injection-molded at 230° C. to prepare IZOD test samples having 4 mm in thickness. These test samples were placed in a Geer oven heated at 150° C. to measure deterioration after an elapse of 120 hours. The deterioration was shown in terms of IZOD and a discoloration value ΔE.

Meanwhile, weatherability was measured after 600 hours of an accelerated test using a Sunshine weather meter, and it was also shown in terms of IZOD and a discoloration value ΔE. The copper carbonate used in Comparative Example 12 was a reagent (for chemical use) manufactured by Wako Pure Chemical Industrial Ltd.

TABLE 4

| | Stabilizer No. and amount | | Heat stability at 150° C. (120 hrs) | | Sunshine test (600 hrs) | |
|---|---|---|---|---|---|---|
| | [part by weight] (phr) | | ΔE | IZOD (kgf · cm/cm$^2$) | ΔE | IZOD (kgf · cm/cm$^2$) |
| Ex. 11 | A | 0.1 | 3.1 | 30.6 | 2.4 | 6.9 |
| Ex. 12 | B | 0.1 | 2.7 | 32.6 | 3.7 | 7.5 |
| Ex. 13 | C | 0.1 | 4.8 | 26.5 | 3.5 | 7.6 |
| Ex. 14 | D | 0.1 | 3.0 | 28.3 | 3.3 | 7.2 |
| Ex. 15 | A | 0.3 | 2.5 | 26.5 | 3.7 | 7.5 |
| Ex. 16 | A | 0.5 | 3.7 | 26.2 | 7.8 | 7.5 |
| Ex. 17 | B | 0.3 | 2.1 | 26.0 | 9.0 | 7.7 |
| Comp.Ex. 10 | — | | 5.3 | 26.7 | 8.5 | 3.6 |
| Comp.Ex. 11 | CuCl$_2$—2H$_2$O*$^3$ | 0.1 | 32.6 | 0 | 12.3 | 6.1 |
| Comp.Ex. 12 | Cupric carbonate E | 0.1 0.1 | 34.8 | 0 | 13.2 | 6.8 |

[Examples 18 to 21 and Comparative Examples 13 to 15]

100 parts by weight of nylon 6 (EX-1222 manufactured by Unichika Ltd.), 0.1 part by weight of N,N'-hexamethylene-bis(3,5-di-t-butyl-4-hydroxy-hydrocinnamide), 15.0 parts by weight of decabromodiphenyl oxide and 5.0 parts by weight of antimony trioxide were kneaded and extruded together with stabilizers shown in Table 5 with a monoaxial kneading extruder at 250° C. at 80 rpm to prepare pellets. The thus obtained pellets were dried in vacuum at 70° C. for 16 hours and injection-molded at 250° C. to prepare IZOD test samples having 4 mm in thickness. Weatherability of these test samples was measured using a Sunshine weather meter after 300 hours of an accelerated test, and it was shown in terms of IZOD and a discoloration value ΔE.

TABLE 5

| | Atabilizer No. and amount | | Cu content of composition (%) | Sunshine test (300 hrs) | |
|---|---|---|---|---|---|
| | [part by weight] (phr) | | | ΔE | IZOD (kgf · cm/cm$_2$) |
| Ex. 18 | A | 0.5 | 0.017 | 24.8 | 19.2 |
| Ex. 19 | B | 0.1 | 0.011 | 23.7 | 19.5 |
| Ex. 20 | C | 0.05 | 0.012 | 24.1 | 19.6 |
| Ex. 21 | D | 0.2 | 0.018 | 24.3 | 19.6 |
| Comp.Ex. 13 | CuCl$_2$—2H$_2$O*$^3$ | 0.045 | 0.014 | 26.6 | 17.2 |
| Comp.Ex. 14 | CuO*$^2$ | 0.05 | 0.033 | 28.5 | 18.1 |
| Comp.Ex. 15 | — | | — | 30.4 | 18.0 |

A thermoplastic resin containing a hydrotalcite compound having fine crystals of copper oxide on the surface thereof and a molded article thereof are excellent in heat resistance and weatherability. When the thermoplastic resin is a halogenated resin, it exhibits more excellent chalking resistance. Cupric oxide present on the surface of the hydrotalcite compound is not specified as a poison and its handling is safe.

What is claimed is:

1. A resin composition wherein a hydrotalcite compound having copper oxide fine crystals on the surface thereof is contained in a thermoplastic resin.

2. The resin composition of claim 1, wherein the hydrotalcite compound has copper oxide having a crystal size of 500 Å or less on the surface thereof.

3. The resin composition of claim 1, wherein the hydrotalcite compound is a hydrotalcite compound on the surface of which copper oxide fine crystals are deposited.

4. The resin composition of claim 1, wherein the hydrotalcite compound is contained in an amount of 0.01 to 5 parts by weight based on 100 parts by weight of the thermoplastic resin.

5. The resin composition of claim 1, wherein the hydrotalcite compound contains 3 to 45% by weight of copper oxide.

6. The resin composition of claim 1, wherein the thermoplastic resin is at least one selected from the group consisting of halogenated resins, polyolefin resins and polyamide resins.

7. The resin composition of claim 1, wherein the thermoplastic resin is a halogenated resin.

8. The resin composition of claim 1, wherein the thermoplastic resin contains halogen or a halogen compound.

9. Molded article formed of the resin composition of claim 1.

10. A method of stabilizing a thermoplastic resin against the effects of heat and weather, the method comprising:
    admixing a thermoplastic resin with a hydrotalcite compound having copper oxide fine crystals on the surface thereof.

11. The method of claim 10, wherein the hydrotalcite compound has copper oxide having a crystal size of 500 Å or less on the surface thereof.

12. The method of claim 10, wherein the hydrotalcite compound is a hydrotalcite compound on the surface of which copper oxide fine crystals are deposited.

13. The method of claim 10, wherein 0.01 to 5 parts by weight of said hydrotalcite compound is admixed with 100 parts by weight of the thermoplastic resin.

14. The method of claim 10, wherein said hydrotalcite compound contains 3 to 45% by weight of copper oxide.

15. The method of claim 10, wherein said thermoplastic resin is at least one resin selected from the group consisting of halogenated resins, polyolefin resins and polyamide resins.

16. The method of claim 10, wherein said thermoplastic resin is a halogenated resin.

17. The method of claim 10, wherein said thermoplastic resin contains halogen or a halogen compound.

* * * * *